United States Patent Office 3,600,420
Patented Aug. 17, 1971

3,600,420
PREPARATION OF PIMELIC ACID DERIVATIVES
George E. Illingworth, Mount Prospect, Ill., assignor to Universal Oil Products Company, Des Plaines, Ill.
No Drawing. Filed Mar. 29, 1968, Ser. No. 717,436
Int. Cl. C07c 55/16, 69/46, 153/07
U.S. Cl. 260—455C
11 Claims

ABSTRACT OF THE DISCLOSURE

Pimelic acid derivatives are prepared by condensing allene with a carboxylic acid or a derivative thereof in the presence of a free radical initiator.

---

This invention relates to a process for the production of pimelic acid and derivatives thereof. More particularly, the invention is concerned with the process for condensing allene witth a carboxylic acid compound in the presence of certain free radical initiators to prepare a compound which is useful in various chemical processes.

Pimelic acid (1,5-pentane dicarboxylic acid) and derivatives thereof comprises useful chemical compounds. For example, pimelic acid is useful as a reagent in biochemical research. Furthermore, the acid and derivatives thereof such as the dihalides are useful in the preparation of polymers or as plasticizers. In addition, it is also contemplated within the scope of this invention that other dicarboxylic acids and derivatives thereof such as azelaic may also be prepared according to the process described herein, said acid or derivatives thereof being useful in organic synthesis, as components of lacquers, alkyd resins, polyamides, plasticizers, jet engine lubricants, etc.

It is therefore an object of this invention to provide a process for the preparation of higher molecular weight dicarboxylic acids.

A further object of this invention is found in the process for condensing a diolefin with a lower molecular weight carboxylic acid or derivative thereof to prepare higher molecular weight dicarboxylic acids.

In one aspect an embodiment of this invention resides in a process for the production of a pimelic acid compound which comprises condensing allene with a carboxylic acid or derivative thereof in the presence of a free radical initiator at condensation conditions, and recovering the resultant pimelic acid compound.

A specific embodiment of this invention is found in a process for the production of a pimelic acid compound which comprises condensing allene with acetic acid in the presence of di-t-butyl peroxide at a temperature in the range of from about ambient up to about 350° C. and a pressure in the range of from about 2 to about 100 atmospheres, and recovering the resultant pimelic acid.

Other objects and embodiments will be found in the following further detailed description of the present invention.

As hereinbefore set forth, the present invention is concerned with a process for preparing pimelic acid compounds comprising pimelic acid or derivatives thereof by condensing allene with a carboxylic acid or derivative thereof in the presence of certain catalytic compositions of matter of the type hereinafter set forth in greater detail. The process is preferably effected at condensation conditions which will include a temperature in the range of from ambient (about 25° C.) up to about 350° C. or more and at a superatmospheric pressure, the pressure used being in a range of from about 2 to about 100 atmospheres or more. The particular pressure which is used will be that which is necessary or sufficient to maintain the allene in the liquid phase and will be provided for by the introduction of a substantially inert gas such as nitrogen into the reaction vessel.

The unsaturated compound which is utilized as one of the reactants in the present process will comprise a diolefinic hydrocarbon containing 1,2-unsaturation. In this respect, the preferred reactant will comprise 1,2-propadiene (allene). This unsaturated hydrocarbon is condensed with a carboxylic acid or derivative thereof, said carboxylic acid or derivative thereof having the generic formula:

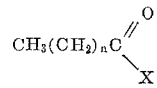

in which X may be selected from the group consisting of hydroxy, halogen, amino, alkylamino, dialkylamino, alkoxy, or thioalkoxy radicals, and $n$ is an interger of from 0 to about 4. The carboxylic acid or derivative thereof is present in the reaction mixture in a molar excess over the allene, said acid or derivative thereof being present in an amount in the range of from about 2:1 to about 3:1 moles of acid or derivative thereof per mole of allene. Specific examples of these carboxylic acids or derivatives thereof will include acetic acid, propionic acid, butyric acid, valeric acid, etc.; acetyl chloride, acetyl bromide, acetyl iodide, acetyl fluoride, acetamide, N-methylacetamide, N-ethylacetamide, N-n-propylacetamide, N-n-butylacetamide, N,N-dimethylacetamide, N,N-diethylacetamide, N,N-di-n-propylacetamide, N,N-di-n-butylacetamide, methyl acetate, ethyl acetate, n-propyl acetate, n-butyl acetate, methyl thioacetate, ethyl thioacetate, n-propyl thioacetate, butyl thioacetate, propionyl chloride, propionyl bromide, propionyl iodide, propionyl fluoride, propionamide, N-methylpropionamide, N-ethylpropionamide, N-n-propylpropionamide, N-n-butylpropionamide, N,N - dimethylpropionamide, N,N-diethylpropionamide, N,N - di-n-propylpropionamide, N,N-di-n-butylpropionamide, methyl propionate, ethyl propionate, n-propyl propionate, n-butyl propionate, methyl thiopropionate, ethyl thiopropionate, n-propyl thiopropionate, n-butyl thiopropionate, butyryl chloride, butyryl bromide, butyryl iodide, butyryl fluoride, butyramide, N-methylbutyramide, N-ethylbutyramide, N-propylbutyramide, N-n-butylbutyramide, N,N-dimethylbutyramide, N,N-diethylbutyramide, N,N - di-n-propylbutyramide, N,N-di-n-butylbutyramide, methyl butyrate, ethyl butyrate, n-propyl butyrate, n-butyl butyrate, methyl thiobutyrate, ethyl thiobutyrate, n-propyl thiobutyrate, n-butyl thiobutyrate valeryl chloride, valeryl bromide, valeryl iodide, valeryl fluoride, valeramide, N-methylvaleramide, N-ethylvaleramide, N-n-propylvaleramide, N-n-butylvaleramide, N,N-dimethylvaleramides, N,N - diethylvaleramide, N,N-di-n-propylvalerthiovalerate. It is to be understood that the aforemenamide, N,N-di-n-butylvaleramide, methyl valerate, ethyl valerate, n-propyl valerate, n-butyl valerate, methyl thiovalerate, ethyl thiovalerate, n-propyl thiovalerate, n-butyl thiovalerate. It is to be understood that the aforementioned carboxylic acids and derivatives thereof are only representative of the class of compounds which may be used and that the present invention is not necessarily limited thereto.

The condensation of the aforementioned unsaturated hydrocarbon such as allene and the carboxylic acid or derivative thereof is effected in the presence of a free radical initiator. These initiators are capable of forming free radicals under the conditions of the reaction. An example of the type of free radical initiator which may be used will include peroxy compounds containing the bivalent radical —O—O— and which are capable of inducing the transfer of a hydrogen atom from the carboxylic acid or derivative thereof thereby permitting the formation of free radicals which can add to the unsaturated hydrocarbon. The organic peroxy compounds constitute a preferred class of catalyst for use in this invention and include peracetic acid, persuccinic acid, dimethyl peroxide, diethyl peroxide, dipropyl peroxide, di-t-butyl peroxide, butyryl peroxide, lauroyl peroxide, benzoyl peroxide, tetrahydronaphthalene peroxide, urea peroxide, t-butyl perbenzoate, t-butyl hydroperoxide, methylcyclohexyl hydroperoxide, cyclohexanone peroxide, cumene hydroperoxide, etc. Thus, organic peroxy compounds which are compounded commercially with various diluents for use as free radical generating catalysts may be used and include benzoyl peroxide compounded with calcium sulfate, benzoyl peroxide compounded with camphor, etc. Only catalytic amounts (less than stoichiometric amounts) are needed.

When utilizing this type of free radical initiator, the reaction of the present process involving the aforementioned starting materials is effected at elevated reaction temperatures which should be at least as high as the initial decomposition temperature of the free radical generating initiator or catalyst, such as the peroxide compound, in order to liberate and form free radicals which promote the reaction. In selecting a particular reaction temperature for use in the process of the present invention, two considerations must be taken into account. First, sufficient energy by means of heat must be supplied to the reaction system so that the reactants, namely, the unsaturated hydrocarbon and the carboxylic acid or derivative thereof, will be activated sufficiently for the hydrogen transfer to take place when free radicals are generated by the catalyst. Second, free radical generating catalysts such as peroxy compounds, particularly organic peroxides, decompose at a measurable rate with time in a logarithmic function dependent upon temperature. This rate of decomposition can be and ordinarily is expressed as the half life of a peroxide at a particular temperature. For example, the half life in hours for di-t-butyl peroxide is 17.5 hours at 125° C., 5.3 hours at 135° C. and 1.7 hours at 145° C. (calculated from data for the first 33% decomposition). A reaction system temperature must then be selected so that the free radical generating catalyst decomposes smoothly with the generation of free radicals at a half life which is not too long. In other words, sufficient free radicals must be present to induce the present chain reaction to take place, and these radicals must be formed at a temperature at which the reactants are in a suitably activated state for condensation. When the half life of the free radical generating catalyst is greater than 10 hours, radicals are not generated at a sufficient rate to cause the reaction to go forward at a detectable rate. Thus, the reaction temperature may be within the range of from about 50° to about 300° C. and at least as high as the decomposition temperature of the catalyst, by which is meant a temperature such that the half life of the free radical generating catalyst is not greater than 10 hours. Since the half life for each free radical generating catalyst is different at different temperatures, the exact temperature to be utilized in a particular reaction will vary. However, persons skilled in the art are well acquainted with the half life vs. temperature data for different free radical generating catalysts and thus it is within the skill of one familiar with the art to select the particular temperature needed for any particular catalyst. However, the operating temperatures generally do not exceed the decomposition temperature of the catalyst by more than about 150° C. For example, when free radical generating catalyst such as t-butyl perbenzoate is used having a decomposition temperature of approximately 115° C., the operating temperature of the process is from about 115° to about 265° C. When di-t-butyl peroxide having a decomposition temperature of about 130° C. is used, the process is run at a temperature ranging from about 130° to about 280° C. Higher reaction temperatures may be employed, but little advantage is gained if the temperature is more than the hereinbefore mentioned 150° C. higher than the decomposition temperature of the catalyst. In addition to the elevated temperatures which are utilized, the reaction may also be effected at elevated pressures ranging from about 1 to about 100 atmospheres or more, the preferred operating pressure of the process being that which is required to maintain a substantial portion of the reactants in liquid phase. Pressure is not an important variable in the process of this invention. However, because of the low boiling points of some of the reactants, it is necessary to utilize pressure withstanding equipment, to insure liquid phase conditions. In batch type operations it is often desirable to utilize pressure withstanding equipment, to charge the reactants and catalyst to the vessel, and to pressure the vessel with 10, 30, 50 or more atmospheres with an inert gas such as nitrogen. This helps to insure the presence of liquid phase conditions. However, when the mole quantity of reactants is sufficient, the pressure which they themselves generate at the temperature utilized is sufficient to maintain the desired phase conditions. Furthermore, the concentration of the catalyst employed in this process may vary over a rather wide range but it is desirable to utilize low concentrations of catalysts such as from about 0.1 to about 10% of the total weight of the combined starting materials charged to the process. The reaction time may be within the range of from less than one minute to several hours depending upon the temperature and half life of the free radical generating catalyst. Generally speaking, contact times of at least 10 minutes are preferred.

It is also contemplated that other free radical initiators besides the peroxy compounds may be used. Other examples of these initiators include azo compounds such as 2,2'-azobis(2-methylpropionitrile) which decomposes at a temperature of about 103° C., 1,1'-azobisformamide which decomposes at about 200° C., azomethane, etc. In addition, another type of free radical initiator which may be used comprises ultra-violet light. When utilizing this type of free radical initiator, the reaction is effected in an appropriate apparatus such as a quartz reactor or a reactor made of a synthetic material known in the trade as Vycor. The mixture of allene and the carboxylic acid or derivative thereof are subjected to irradiation emitting from an ultra-violet light source which preferably has a wave length of between 2000 and 5000 A. One type of light source which may be used comprises a medium pressure mercury arc lamp. These lamps usually contain a small amount of mercury vapor and a large amount of a rare gas, the total pressure being above atmospheric. These mercury arc lamps possess strong emission lines at 2900 A. and 2660 A., among others. In addition, a low pressure mercury arc lamp containing mercury vapor and rare gases, the total pressure being below atmospheric, may also be used. Other sources which may be utilized for the ultra-violet light comprise a specially prepared fluorescent light which will also emit energy at the desired wave lengths, that is, a large portion of wave lengths not higher than 3700 A. In addition to the aforementioned free radical initiators, it is also contemplated that the process may be effected by subjecting the mixture to ionizing radiation from an external source (e.g. $Co^{60}$ irradiation).

The process of this invention may be effected in any suitable manner and may comprise either a batch or continuous type operation. For example, when a batch type operation is used, a quantity of the starting materials comprising the unsaturated hydrocarbon, and preferably allene, along with the carboxylic acid or derivative thereof are placed in an appropriate or suitable reaction vessel, one such type vessel which may be used comprising an autoclave, either of the rotating or mixing type. In addition, the catalytic amount of the free radical initiator, as in peroxy or azo form, is also added to the reaction vessel. However, as hereinbefore set forth, if the free radical initiator to be employed comprises an ultra-violet light source, the reaction vessel must, of necessity, comprise a quartz or Vycor reactor. The reactor is pressured to the desired operating pressure in order to maintain the allene in a liquid state and the vessel is thereafter heated to an operating temperature in the range hereinbefore set forth in greater detail. Upon completion of the desired residence time, which may range from 0.5 up to about 10 hours or more in duration, the reactor and contents thereof are allowed to return to room temperature. The excess pressure is discharged and the reaction mixture is recovered. The product is separated from the catalyst, if one is used, and from any unreacted starting materials, said separation being accomplished by conventional means such as, for example, fractional distillation, fractional crystallation, etc.

It is also contemplated within the scope of this invention that the process may be effected in a continuous manner. When this type of operation is used, the starting materials, comprising the unsaturated hydrocarbon such as a 1,2-diolefinic hydrocarbon, and particularly allene, is continuously charged to a reaction vessel as is the carboxylic acid or derivative thereof. The reaction vessel, which may be of the type hereinbefore discussed, is maintained at the proper operating conditions of temperature and pressure. In the event that an azo compound or a peroxy compound is to be used to initiate the reaction, the initiator is also charged to the reactor through a separate line or, if so desired, it may be admixed with one or both of the reactants prior to entry into said reactor and charged thereto through a single stream. The charge rate of the reaction mixture is maintained at a sufficient velocity in order to quickly remove the reaction product from the catalyst zone, thus avoiding undesirable decomposition reactions which may occur due to the elevated temperatures during the reaction period. When utilizing an outside source as ultra-violet light or ionizing radiaation as the free radical initiator, it may be possible to utilize lower space velocities. However, when utilizing lower space velocities, it may be preferable to have a substantially inert organic solvent comprising a high boiling paraffin such as n-heptane or an aromatic hydrocarbon such as benzene, toluene, etc. present in the reaction zone. The reactor effluent, which is continuously withdrawn from the reaction zone, is subjected to conventional separation means whereby the catalyst, unreacted starting materials, and/or side reaction products which may have formed during the reaction are separated from the desired higher molecular weight dicarboxylic acid or derivative thereof, the unreacted starting materials being recycled to form a portion of the feed stock while the higher molecular weight dicarboxylic acid or derivative thereof is recovered.

Examples of pimelic acid derivatives which may be prepared according to the process of this invention will include pimelic acid, pimelyl dichloride, pimelyl dibromide, pimelyl diiodide, pimelyl difluoride, N,N'-dimethylpimeldiamide, N,N'-diethylpimeldiamide, N,N'-di-n-propylpimeldiamide, N,N'-di-n-butylpimeldiamide, dimethyl pimelate, diethyl pimelate, di-n-propyl pimelate, di-n-butyl pimelate, dimethyl thiopimelate, diethyl thiopimelate, di-n-propyl thiopimelate, di-n-butyl thiopimelate, 2,6-dimethylpimelic acid, 2,6 - diethylpimelic acid, 2,6-di-n-propylpimelic acid, 2,6-di-n-butylpimelic acid, etc. It is to be understood that the aforementioned compounds are only representative of the pimelic acid and derivatives thereof which may be prepared according to the process described herein and that said invention is not necessarily limited thereto.

The following examples are given to illustrate the process of the present invention which, however, are not intended to limit the generally broad scope of the present invention in strict accordance therewith.

EXAMPLE I

In this example a mixture of 20 grams (0.5 mole) of 1,2-propadiene (allene) is charged to a rotating autoclave which contains 3 grams (0.02 mole) of di-t-butyl peroxide and 60 grams (1.0 mole) of acetic acid. The autoclave is sealed and nitrogen is pressed in until a pressure of about 30 atmospheres is reached. The autoclave and contents thereof are then heated to a temperature of about 200° C. and maintained thereat for a period of about 4 hours. At the end of this time, the autoclave and contents thereof are allowed to return to room temperature, the excess pressure is discharged and the reaction mixture is recovered. The desired product comprising pimelic acid is separated and recovered by fractional distillation under reduced pressure.

EXAMPLE II

To a rotating autoclave containing 78.5 grams (0.1 mole) of acetyl chloride and 3 grams (0.02 mole) of di-t-butyl peroxide is charged 20 grams (0.5 mole) of allene. The autoclave is sealed, nitrogen is pressed in until an initial pressure of 30 atmospheres is reached and the autoclave is then heated to a temperature of about 160° C. The autoclave is maintained at this temperature for a period of about 4 hours, following which it is allowed to return to room temperature and the excess pressure is discharged. The autoclave is opened and the reaction mixture is recovered therefrom. The mixture is subjected to conventional separation means whereby the desired product comprising pimelyl dichloride is separated from the unreacted acetyl chloride, allene, and catalyst.

EXAMPLE III

In this example a mixture of 20 grams (0.5 mole) of allene, 2.4 grams (0.02 mole) of 2,2'-azobis(2-methylpropionitrile) and 73 grams (1.0 mole) of N-methylacetamide is placed in a rotating autoclave which is pressured to an initial pressure of 30 atmospheres by the introduction of nitrogen thereto. The autoclave is heated to a temperature of about 110° C. and maintained thereat for a period of approximately 4 hours. At the end of this time, the autoclave and contents thereof are allowed to cool to room temperature, the excess pressure is discharged and the reaction mixture is recovered. The mixture is subjected to fractional distillation under reduced pressure whereby the desired product comprising N,N'-dimethylpimeldiamide is recovered.

EXAMPLE IV

In this example 20 grams (0.5 mole) of allene is charged to a rotating autoclave containing 3 grams (0.02 mole) of di-t-butyl peroxide and 74 grams (1.0 mole) of methyl acetate. The autoclave is sealed and nitrogen is pressed in until an initial pressure of 25 atmospheres is reached. The autoclave is heated to a temperature of about 200° C. and maintained thereat for a period of about 4 hours. At the end of this time, the heating is discontinued and the autoclave is allowed to return to room temperature. After the excess pressure is discharged, the autoclave is opened and the reaction mixture is recovered therefrom. The mixture is removed from the autoclave and subjected to fractional distillation under reduced pressure whereby the desired product comprising dimethyl pimelate is separated and recovered.

EXAMPLE V

A mixture of 20 grams (0.5 mole) of allene, 1 gram (0.02 mole) of dimethyl peroxide and 90 grams (1.0 mole) of ethyl thioacetate is subjected to a treatment similar to that set forth in the above examples. After maintaining the autoclave at a temperature of about 200° C. and an initial pressure of 25 atmospheres of nitrogen for a period of about 4 hours, heating is discontinued and the system is allowed to return to room temperature. The excess pressure is discharged and the reaction mixture is subjected to separation steps whereby the desired product comprising diethyl thiopimelate is recovered.

EXAMPLE VI

Similar runs to those described in Examples I to V above using other free radical initiators such as ultraviolet light having a wave length below 3700 A., azo compounds such as 1,1-azobisformamide and ionizing radiation, for example, radiation from Co[60] will give similar results.

I claim as my invention:

1. A process for the production of a pimelic acid compound which comprises condensing allene with a carboxylic acid or derivative thereof in the presence of a free radical initiator other than the last-named reactant, said carboxylic acid or derivative thereof having the generic formula:

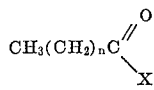

in which X is selected from the group consisting of hydroxy, halogen, amino, alkylamino, dialkylamino, alkoxy, and thioalkoxy radicals, and $n$ is an integer of from 0 to about 4.

2. The process as set forth in claim 1, further characterized in that said condensation is effected at a temperature in the range of from about ambient up to about 350° C. and a pressure in the range of from about 2 to about 100 atmospheres.

3. The process as set forth in claim 1, further characterized in that said free radical initiator comprises a peroxy compound.

4. The process as set forth in claim 3, further characterized in that said peroxy compound comprises di-t-butyl peroxide.

5. The process as set forth in claim 1, further characterized in that said free radical initiator comprises an azo compound.

6. The process as set forth in claim 5, further characterized in that said azo compound comprises 2,2'-azobis-(2-methylpropionitrile).

7. The process as set forth in claim 1, further characterized in that said allene is reacted with acetic acid and the resultant compound comprises pimelic acid.

8. The process as set forth in claim 1, further characterized in that said allene is reacted with acetyl chloride and said compound comprises pimelyl dichloride.

9. The process as set forth in claim 1, further characterized in that said allene is reacted with N-methylacetamide and said compound comprises N,N'-dimethyl pimeldiamide.

10. The process as set forth in claim 1, further characterized in that said allene is reacted with methyl acetate and said compound comprises dimethyl pimelate.

11. The process as set forth in claim 1, further characterized in that said allene is reacted with ethyl thioacetate and said compound comprises diethyl thiopimelate.

References Cited

UNITED STATES PATENTS 2,851,486    9/1958    Natta et al. _____ 260—533

OTHER REFERENCES

Gould: "Mechanism and Structure in Organic Chemistry," 1959, pp. 687–8.

Taylor: article "The Chemistry of Allenes," in Chemical Reviews, 67 (1967), pp. 340–41.

LEWIS GOTTS, Primary Examiner

R. S. WEISSBERG, Assistant Examiner

U.S. Cl. X.R.

204—158R; 260—485R, 533R, 537R, 544Y, 561K